Patented Mar. 17, 1936

2,034,519

UNITED STATES PATENT OFFICE 2,034,519

COMPOSITION OF MATTER, ETC.

Leon H. Larson, Norwalk, Conn., assignor to R. T. Vanderbilt Co. Inc., New York, N. Y., a corporation of New York No Drawing. Application March 16, 1932,
Serial No. 599,341

14 Claims.  (Cl. 134—18)

This invention relates to a new composition of matter and to improved methods of using the same for coating, filling and other purposes.

The new composition is a dry mixture in which clay is intimately admixed with lime and alum, or with lime, alum and other ingredients, in varying proportions. The composition is prepared by mixing the materials dry to obtain an intimate and uniform admixture.

When the dry composition is added to water in suitable amount, the lime and alum will react in the presence of the clay to form a reaction mixture or composition containing the clay distributed in and suspended in the reaction products of the lime and alum. The reaction mixture thus produced is a valuable material for use as a filling material for paper or textiles or for coating paper or textiles, etc. and for various other purposes.

Clay is extensively used as a filling and coating material, but the color of clay or of many clays prevents their use for purposes where a light colored product is desired, and, as a result, other filling or coating materials are used instead of clay for such light colored products.

I have found, however, that when clay is intimately admixed with lime and alum in proper proportions, the resulting composition, when admixed with water and used instead of clay for coating and filling, etc., gives improved and superior results, and, in particular, gives a light-colored filling material. While I do not wish to limit myself to any theoretical explanation of the results obtained, nevertheless I believe the improved results to be due to the fact that the lime and alum in reacting together form more or less colloidal reaction products which tend to coat or blend with the clay particles to give a filling material of a much lighter color or even of a white color, as compared with the darker color of the clay when used by itself.

The clay used will ordinarily be dried and finely ground to the requisite fineness for use as a filler or coating material before it is admixed with the lime and alum, although the grinding can be carried out after admixture. The lime and alum are admixed in a finely divided state so that the resulting dry mix or composition contains the clay, lime and alum in a fine state of division. It is important that the ingredients be mixed dry before adding them to water, so that, when the lime and alum react, they will react in intimate admixture with the clay.

Improved results can be obtained in the coating of paper, and also in the filling of paper, by using the dry composition and adding it to a limited amount of water so that the reaction between the lime and alum will take place in the presence of the clay to form a reaction mixture in which the clay is suspended in and surrounded by the reaction products of the lime and alum, and by then using the resulting reaction products for coating or filling. A satisfactory product cannot be produced by causing the lime and alum to react first and subsequently admixing the reaction product with the clay.

The proportions of clay, lime and alum used in making the new composition can be varied. In general the clay will be present in preponderating amount and the lime and alum in smaller amount, the lime and alum usually being less than 30 or 40% of the weight of the clay, that is, for each 100 parts by weight of the clay the lime and alum together may be used in varying amounts up to around 30 to 40% or so of the clay.

The proportions of alum and lime to each other can also be varied, for example, from about equal proportions of lime and alum to an amount of alum which is about four times the weight of the lime or somewhat more.

The amount of water used with the dry mixture can be varied but in general a limited amount of water should be used, for example, from 60 to 150 parts by weight of water to 100 parts by weight of the dry mixture. The water can be added to the dry mixture, or the dry mixture can be added to water, and the resulting admixture should be stirred or agitated in a suitable tank or mixing apparatus to promote the reaction between the lime and alum and the obtaining of a uniform product. The reaction takes some time, but is usually completed in an hour or less. The reaction mixture is of plastic or pasty consistency.

I have also found that the composition can be improved by incorporating therein a small amount of trisodium phosphate, or equivalent substance, which will serve to thin out the mixture and make it free flowing. The use of a small amount of trisodium phosphate appears to have an important effect on the colloidal properties of the composition when it is incorporated with water and the reaction between the lime and alum takes place in the presence of the clay. The amount of trisodium phosphate used can be varied, for example, from around one-tenth of one percent or less up to around two percent of the other ingredients (clay, lime and alum).

The lime employed in the new composition is hydrated lime freed from objectionable admixture of gritty or foreign materials and in a suitably dried and finely divided state so that it can be admixed with the clay and alum to form a uniform product. The alum used is the ordinary alum of commerce in a finely divided state.

The lime employed can be in part replaced by precipitated calcium carbonate such as is obtainable by the carbonating of milk of lime or as a by-product from the causticizing of sodium carbonate solutions with milk of lime. The precipitated carbonate will be dried and reduced to a finely divided state, if not already produced in such a state, so that it can be uniformly admixed with the other ingredients. The replacing of part of the lime with calcium carbonate appears to further improve the properties of the composition, in some cases, as compared with similar compositions in which hydrated lime is used without addition of calcium carbonate.

The following examples further illustrate the invention, but the invention is not limited thereto.

A dry mix is made of about 1300 parts by weight of clay, 120 parts of alum, 60 parts of hydrated lime and 15 parts of trisodium phosphate. The ingredients are prepared in a finely divided state before admixture, and are then intimately admixed to form a substantially uniform dry mix. This dry mixture can be shipped and stored, and can be readily used by adding the proper amount thereof to water and permitting the reaction to take place between the alum and the lime.

In the above example the amount of trisodium phosphate can be varied, for example, from 1 to 30 parts. The ratio of lime and alum can also be varied, for example, from about equal proportions, up to around 4 parts of alum to 1 of lime. So also, the proportion of lime and alum together to the clay can also be varied, and amounts of lime and alum used, for example, which represent up to around 30% or even 40% by weight of the weight of the clay.

As illustrating the use of calcium carbonate together with lime in the new dry mix, there can be used, for example, about 1300 parts by weight of clay, 120 parts of alum, 50 parts of hydrated lime, 25 parts of precipitated calcium carbonate and 15 parts of trisodium phosphate. The ingredients should be finely divided before uniform admixture, or further grinding can be effected after admixture to insure that the different ingredients will be in a finely divided state.

In using the dry mix of the present invention it is added to water, or water is added to it, in properly regulated proportions, for example, using about 1350 pounds of water with the amount of dry mixture (about 1500 pounds) of the above examples, and the resulting admixture is stirred or agitated for a period of time, for example, about 1 hour, or until the reaction has been practically completed and a smooth, uniform, plastic or pasty mass obtained.

The reaction products resulting from the reaction of alum and lime in the presence of clay and water are more or less colloidal in character, and the reaction products are more or less gelatinous and voluminous. When the reaction takes place in the presence of clay uniformly distributed throughout the mixture, the clay is suspended in the reaction product, and it seems probable that the individual particles of clay are more or less coated with the colloidal reaction product.

In the ordinary process of filling paper, it is customary to add clay to the beater so that it will be incorporated in the paper when the pulp, after beating and subsequent dilution, is formed into a sheet of paper on the paper machine. The new dry composition, when first added to water and caused to react as above described and the resulting reaction mixture is added to the beater, forms a valuable substitute for clay as a filler and appears to have a coagulating effect on the water in which the pulp is suspended so that losses in the white water or waste water are minimized.

The new dry composition, after reaction with water, also forms a valuable substitute for untreated clay for coating paper. In applying the new composition for coating paper, the dry mixture is added to water and the reaction is permitted to take place, as above described, and the reaction mixture is then added to a solution or suspension of other ingredients, such as a solution of casein or glue in alkali, and the resulting mixture is used for coating. In general, the reaction products produced from the dry mixture, on reaction in water, can be used with casein, etc. much as clay is used in coating paper, but with added advantages, since the dry mixture can be used to replace not only part or all of the clay commonly used, but also part or all of the previously prepared reaction products of alum and lime, which reaction products have been separately prepared, and which are now employed in a previously prepared form for certain grades of coated paper.

The variation of the proportions of lime and alum to clay, in the dry mixture, enables lighter colored products to be produced, by increasing the proportion of alum and lime, while even with lower proportions of alum and lime to the clay, the product is a much lighter product than the clay itself.

The new dry composition, after reaction in water, can be used for the coating or filling of other materials than paper, for example, for filling textile materials or fabrics of various kinds. The reaction products can be dried and the dried product ground and used as a pigment or filler for various purposes such as rubber, oil paints, etc., giving a lighter colored product than the clay itself, and a product which for certain purposes is much more valuable. The reaction product, without drying, and properly diluted with water, and with other admixtures if desired, can be used directly as a cold water paint or for other purposes.

It will thus be seen that the present invention provides an improved dry composition, which can be prepared and marketed in a dry state, and which can be readily used, when desired, merely by adding it to water and permitting the reaction between the alum and lime to take place in the presence of the clay. The reaction products so produced, when the dry mixture reacts in water, form valuable filling and coating ingredients, being adapted for use much the same as clay itself is now used, but with important advantages over the use of clay alone.

I claim:

1. A new composition comprising a dry mixture of clay, alum and lime which composition may be added to water with resulting reaction of the alum and lime in the presence of the clay to form a reaction mixture containing the clay in the reaction products of the alum and lime.

2. A new composition comprising a dry mixture of clay, alum and lime, the clay being present in preponderating amount, and the proportion of alum to lime varying from about equal proportions to around four times as much alum as lime which composition may be added to water with resulting reaction of the alum and lime in the presence of the clay to form a reaction mixture containing the clay in the reaction products of the alum and lime.

3. A new composition comprising a dry mixture of clay, alum, lime and calcium carbonate which composition may be added to water with resulting reaction of the alum and lime in the presence of the clay and calcium carbonate to form a reaction mixture containing the clay and calcium carbonate in the reaction products of the alum and lime.

4. A new composition comprising a dry mixture of clay, alum and lime, the ratio of lime to alum varying from about equal proportions to about four times as much alum as lime, the amount of lime and alum together being from 10 to 40% of the weight of the clay, and the mixture being adapted, when added to water, to form a suspension of clay in the reaction products of the lime and alum.

5. A new composition comprising a dry mixture of clay, alum, lime and trisodium phosphate which composition may be added to water with resulting reaction of the alum and lime in the presence of the clay to form a reaction mixture containing the clay in the reaction products of the alum and lime.

6. A new composition comprising a dry mixture of clay, alum, lime and trisodium phosphate, the trisodium phosphate being from about one tenth percent to two percent of the total mixture, the clay being in preponderating amount, and the ratio of lime to alum varying from about equal proportions to about four times as much alum as lime which composition may be added to water with resulting reaction of the alum and lime in the presence of the clay to form a reaction mixture containing the clay in the reaction products of the alum and lime.

7. A new composition comprising a dry mixture of about 1300 parts of clay, about 120 parts of alum, about 60 parts of lime and about 15 parts of trisodium phosphate which composition may be added to water with resulting reaction of the alum and lime in the presence of the clay to form a reaction mixture containing the clay in the reaction products of the alum and lime.

8. A new composition comprising a dry mixture of about 1300 parts of clay, about 120 parts of alum, about 50 parts of lime, about 25 parts of calcium carbonate and about 15 parts of trisodium phosphate which composition may be added to water with resulting reaction of the alum and lime in the presence of the clay and calcium carbonate to form a reaction mixture containing the clay and calcium carbonate in the reaction products of the alum and lime.

9. The method of producing a composition suitable for use for filling or coating paper or for other purposes which comprises causing dry alum and dry lime to react in the presence of clay and water to form a reaction mixture containing the clay in suspension in the reaction products of the lime and alum.

10. The further improvement in the process of the preceding claim in which a small amount of trisodium phosphate is also present during the reaction.

11. The method of filling paper which comprises causing dry alum and dry lime to react in the presence of clay and water to form a suspension of the clay in the reaction products of the lime and alum, and incorporating the resulting reaction products with the clay mixed therewith with the paper pulp to be filled.

12. The method of coating paper which comprises causing dry alum and dry lime to react in the presence of clay and water to form a suspension of the reaction products and clay in water, and applying such suspension to the paper to be coated.

13. A new composition comprising the reaction products of alum and lime in the presence of clay and water, the ratio of lime to alum varying from about equal proportions to about four times as much alum as lime, the amount of lime and alum together being from 10 to 40% of the weight of the clay, and the amount of water varying from about 60 to 150 parts by weight to 100 parts by weight of the clay, lime and alum, said composition being in the form of a reaction mixture adapted for use for coating and filling purposes.

14. A new composition comprising the reaction products of lime and alum in the presence of clay and water in about the following proportions, namely, about 1300 parts of clay, about 120 parts of alum, about 50 to 60 parts of lime, and about 1500 parts of water, the resulting reaction mixture forming a valuable composition for filling and coating purposes.

LEON H. LARSON.